(12) United States Patent
Wang

(10) Patent No.: US 10,217,363 B2
(45) Date of Patent: Feb. 26, 2019

(54) METHODS AND SYSTEMS FOR ELECTRONICALLY ASSISTED LANE ENTRANCE

(71) Applicant: Faraday&Future Inc., Gardena, CA (US)

(72) Inventor: Chongyu Wang, Torrance, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 112 days.

(21) Appl. No.: 15/335,187

(22) Filed: Oct. 26, 2016

(65) Prior Publication Data

US 2017/0124882 A1   May 4, 2017

Related U.S. Application Data

(60) Provisional application No. 62/248,177, filed on Oct. 29, 2015.

(51) Int. Cl.
*G08G 1/16* (2006.01)
*G01S 19/42* (2010.01)
(Continued)

(52) U.S. Cl.
CPC .............. *G08G 1/167* (2013.01); *B60Q 9/008* (2013.01); *B60R 1/00* (2013.01); *B60R 11/04* (2013.01);
(Continued)

(58) Field of Classification Search
CPC ....... H04W 48/04; H04W 4/046; H04W 4/60; H04W 12/06; H04W 12/08; H04W 36/0005; H04W 36/32; H04W 36/34; H04W 48/02; H04W 4/12; H04W 4/21; H04W 76/11; H04W 84/005; H04W 4/003; H04W 4/206; G01C 21/165; G01C 1/00; G01C 11/025; G01C 11/08; B64C 19/00; G01S 13/865; G01S 13/867; G01S 13/931; G01S 17/023; G01S 17/936; G01S 19/43; G01S 2007/4975; G01S 2013/9321; G01S 2013/9325; G08G 1/166; G08G 1/096775; G08G 1/0965; G08G 1/096725; G08G 1/096741; G08G 1/01; G08G 1/164; G08G 1/163; G08G 1/161; G08G 1/165; G08G 1/167; G08G 1/0112; G08G 1/096791; G08G 1/133; B60H 1/00742; B60Q 1/143;
(Continued)

(56) References Cited

U.S. PATENT DOCUMENTS 5,790,403 A * 8/1998 Nakayama ........... G05D 1/0246
340/435
6,405,132 B1 * 6/2002 Breed .................... B60N 2/002
701/117
(Continued)

*Primary Examiner* — Aklilu Woldemariam
(74) *Attorney, Agent, or Firm* — Knobbe Martens Olson & Bear LLP

(57) ABSTRACT

Methods and systems for assisted lane entrance are disclosed. In some aspects, a method of assisting movement of a vehicle from one lane to another, includes detecting an entrance to a restricted access lane within a threshold distance in front of the vehicle, determining entrance parameters for the restricted access lane based, at least in part, on a position of the entrance relative to a position of the vehicle, and generating an output signal based on the entrance parameters.

35 Claims, 9 Drawing Sheets

(51) Int. Cl.
    *B60R 11/04*     (2006.01)
    *B62D 15/02*     (2006.01)
    *B60R 1/00*     (2006.01)
    *B60Q 9/00*     (2006.01)
    *G06K 9/00*     (2006.01)
    *G08G 1/015*     (2006.01)
    *G08G 1/0962*     (2006.01)

(52) U.S. Cl.
    CPC .......... *B62D 15/0255* (2013.01); *G01S 19/42* (2013.01); *G06K 9/00798* (2013.01); *G06K 9/00818* (2013.01); *G08G 1/015* (2013.01); *G08G 1/09623* (2013.01); *B60R 2300/804* (2013.01)

(58) Field of Classification Search
    CPC ........ B60Q 1/32; B60Q 2400/40; B60Q 3/80; B60R 25/25; B60R 25/252; B60R 25/257; B60W 2040/0818; B60W 2540/28; B60W 40/09; B60W 30/16; B60W 10/20; B60W 2550/306; B60W 10/04; B60W 2420/42; B60W 2550/12; B60W 2550/308; B60W 2710/20; B60W 2720/10; B60W 30/09; B60W 30/12; B60W 30/143; B60W 2520/14; B60W 10/06; G06F 3/011; G06K 9/00798; G06Q 30/0201; H04L 41/0213; H04L 67/12; H04L 69/164; H04L 41/12; H04L 63/08; H04L 63/166; H04L 69/04; H04L 69/16; H04L 69/327; H04L 43/00; H04L 43/10; H04L 43/16; H04L 29/06; G07C 5/008; G07C 5/0808
    USPC ............... 382/103, 104, 115, 117, 118, 190; 340/435, 5, 990, 575, 576
See application file for complete search history.

(56) References Cited

U.S. PATENT DOCUMENTS

| | | | | |
|---|---|---|---|---|
| 6,526,352 | B1 * | 2/2003 | Breed | G01C 21/3697 342/357.31 |
| 7,027,621 | B1 * | 4/2006 | Prokoski | G06K 9/00248 180/272 |
| 7,038,577 | B2 * | 5/2006 | Pawlicki | B60W 30/18 340/435 |
| 7,504,932 | B2 * | 3/2009 | Bartels | G01S 13/931 340/435 |
| 9,103,671 | B1 * | 8/2015 | Breed | G01C 11/025 |
| 2005/0060069 | A1 * | 3/2005 | Breed | B60N 2/2863 701/408 |
| 2009/0140887 | A1 * | 6/2009 | Breed | G01C 21/165 340/990 |
| 2010/0070164 | A1 * | 3/2010 | Machino | G01C 21/3461 701/533 |
| 2010/0086174 | A1 * | 4/2010 | Kmiecik | G06K 9/00798 382/103 |
| 2011/0227713 | A1 * | 9/2011 | Amann | B60W 30/0953 340/435 |
| 2013/0084847 | A1 * | 4/2013 | Tibbitts | H04W 8/245 455/419 |
| 2013/0321172 | A1 * | 12/2013 | Igarashi | G08G 1/166 340/905 |
| 2013/0342368 | A1 * | 12/2013 | Nathanson | G07C 5/008 340/903 |
| 2013/0345900 | A1 * | 12/2013 | Usui | B60W 30/12 701/1 |
| 2014/0306799 | A1 * | 10/2014 | Ricci | H04W 4/21 340/5.83 |
| 2014/0309789 | A1 * | 10/2014 | Ricci | B60Q 1/00 700/276 |
| 2014/0309864 | A1 * | 10/2014 | Ricci | H04W 4/21 701/36 |
| 2016/0176412 | A1 * | 6/2016 | Gunaratne | B60W 10/10 701/23 |

\* cited by examiner

METHODS AND SYSTEMS FOR ELECTRONICALLY ASSISTED LANE ENTRANCE

CROSS REFERENCE TO RELATED APPLICATIONS

This application claims priority to U.S. Provisional Application No. 62/248,177, filed Oct. 29, 2015, and entitled "METHODS AND SYSTEMS FOR ELECTRONICALLY ASSISTED LANE ENTRANCE." The disclosure of this prior application is considered part of this application, and is hereby incorporated by reference in its entirety.

BACKGROUND

Field of the Invention

This disclosure relates to methods, systems, and apparatus for autonomous driving of vehicles, and in particular, to autonomous assistance with entering a restricted access lane.

Description of the Related Art

Autonomous driving systems are immature but rapidly being developed. Features such as self-parking, automatic braking, adaptive cruise control and highway autopilot have already been delivered to the marketplace. Some claim these features can reduce energy consumption by as much as ten (10) percent when compared to human drivers. Additional features are under development, with an eventual goal of complete automation of driving tasks. Therefore, a need exists for additional autonomous driving features to move from the semi-assisted driving experience of today to the more complete autonomous driving experience of tomorrow.

SUMMARY OF THE INVENTION

The systems, methods, and apparatus of this disclosure each have several innovative aspects, no single one of which is solely responsible for the desirable attributes disclosed herein.

Carpool lanes may encourage carpooling and consequently help reduce carbon emissions. However, current autonomous driving solutions do not provide driver assistance in entering or exiting a carpool lane, or more generally, a restricted access lane. Thus, as autonomous driving becomes more ubiquitous, use of restricted access lanes may be reduced unless methods of autonomous entry and exit of car pool lanes is provided.

The disclosed methods and systems provide for electronic determination and execution of an entrance into a restricted access lane. Some embodiments utilize one or more of a front and/or side facing camera(s) mounted to the vehicle to detect a sign indicating the existence of a restricted access lane. In some aspects, lane markers on a left or right side of the vehicle may be detected to assist with the determination of a proper entrance or exit of a restricted access lane. For example, a solid line typically indicates that an entry or exit of the restricted access lane is prohibited at the current location, whereas a dashed line indicates an entry or exit is permitted.

In some aspects, the methods and systems also determine a number of occupants of the vehicle. For example, the vehicle may include one or more occupant detection sensors located in each of the passenger seats of the vehicle. The number of occupants detected in the vehicle may also be considered when determining whether to enter or exit the restricted access lane. In some aspects, information in a road database may also be considered. For example, in some jurisdictions, a restricted access lane may be used by vehicles including two or more occupants, while in some other jurisdictions, a restricted access lane may be used by vehicles including three or more occupants. The road database may provide indications of the minimum number of occupants necessary to utilize a restricted access lane at a particular location. This information may be considered, along with the number of occupants detected in the vehicle, when determining whether to enter and/or exit the restricted access lane.

Additionally, some jurisdictions provide for use of the restricted access lane by vehicles not meeting the minimum occupancy requirements, but that have other characteristics. For example, in some jurisdictions, certain hybrid or electric vehicles may qualify for use of the restricted access lane regardless of the number of occupants. Thus, in some aspects, the road database discussed above may store information relating to which types of vehicles may be permitted within a restricted access lane, regardless of the number of occupants. The disclosed methods and systems may then compare the information obtained from the road database with preconfigured information indicating the specific type of vehicle in which the methods are performed or the systems are resident, to determine whether the vehicle may enter or exit a restricted access lane.

In some jurisdictions, drivers can pay a tool and utilize the car pool lane despite the number of occupants. Thus, in some implementations, the disclosed methods and systems may interface with one or more of information preconfigured by a user of the vehicle, and or toll accounting systems, typically maintained by a highway or other governmental authority, to determine whether the current vehicle has purchased an authorization to utilize a restricted access lane. The electronic decision as to whether to enter the restricted access lane may then be based on whether an authorization has been purchased.

In some aspects, an on-board computer may receive input indicating an intended destination of the vehicle. For example, in some aspects, this information may be received from a separate navigation system or computer, or may be integrated into the autonomous driving processor itself. In these aspects, a decision or recommendation as to whether to enter or exit a restricted access lane may be based on the destination. For example, if the destination is greater than a threshold distance from a current location, more weight may be given to entering the restricted access lane than when the distance to the destination is less than the threshold distance.

In some aspects, the road database may include information indicating physical locations of entrances and or exits of a restricted access lane in proximity to the vehicle. In some aspects, a relationship between the proximity of the entrances and/or exits of the restricted access lane and the destination of the vehicle may be considered when determining whether to enter a restricted access lane (or recommend entrance to a restricted access lane). For example, while there may be an entrance to the restricted access lane proximate to the vehicle, the next exit for the restricted access lane may be at a distance greater than, or within a threshold distance of, a destination of the vehicle, or an exit on a route to the destination of the vehicle. Therefore, in some aspects, the restricted access lane may not be entered, (or recommended), despite its proximity to the vehicle.

In some aspects, the decision to enter a restricted access lane can be made fully electronically, in that an onboard computer determines that an entry or exit is permissible and performs the entry or exit without any human intervention. In some other aspects, an on-board computer instead generates a recommended action, such as an entry or exit of a restricted access lane. In some aspects, a delay may be introduced before the action is performed, with a user input canceling the recommended action. In some other aspects, unless an input from a human confirms the recommended action, no action, such as an entry or exit of the restricted access lane is performed.

To draw a user's attention to a recommendation requiring user consideration and/or input, one or more visual, audio, or tactile (such as vibration) alerts may be generated. These alerts may appear on an instrument panel or windshield of the vehicle, on a driver's watch or phone, a console of the vehicle, or other regions of the vehicle configured to provide prompts to the driver/occupant.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that can be configured to participate in automated driving systems. More particularly, it is contemplated that the described implementations may be included in or associated with a variety of automated vehicles or similar applications such as, but not limited to automated passenger and cargo vehicles. Thus, the teachings are not intended to be limited to the implementations depicted solely in the Figures, but instead have wide applicability as will be readily apparent to one having ordinary skill in the art.

Figure 1A:
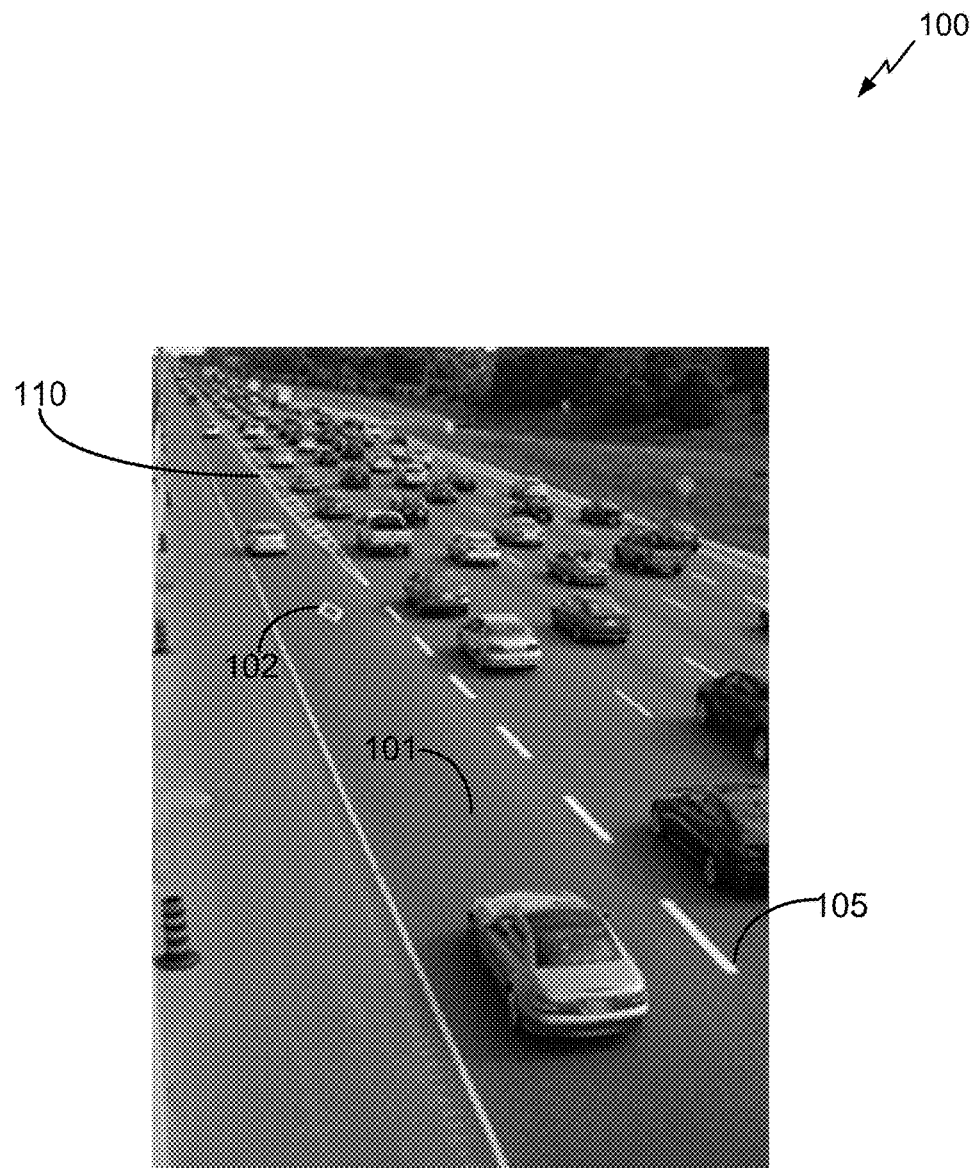
FIG. 1A shows a scene including one example of an entrance and exit to a restricted access lane (RAL).

FIG. 1A shows a scene 100 including one example of an entrance and exit to a restricted access lane (RAL) 101. In the particular example of FIG. 1A, the restricted access lane is a restricted access lane, indicated by at least the "diamond" 102 marked within the lane itself. However, other types of restricted access lanes are also contemplated by the methods and systems disclosed herein. For example, in the disclosed embodiments, access to a lane may be restricted based on one or more of a number of vehicle occupants, a type of propulsion system in the vehicle, whether a fee has been paid to authorize the vehicle to operate within the lane, a number of wheels of the vehicle (for example, motorcycles may be allowed in some lanes in which other vehicles with more wheels are excluded).

An entrance and exit to the restricted access lane 101 in FIG. 1 is shown by at least the dashed line 105. The entrance and exit does not exist at portions of the road with the hatched or solid line 110.

Figure 1B:
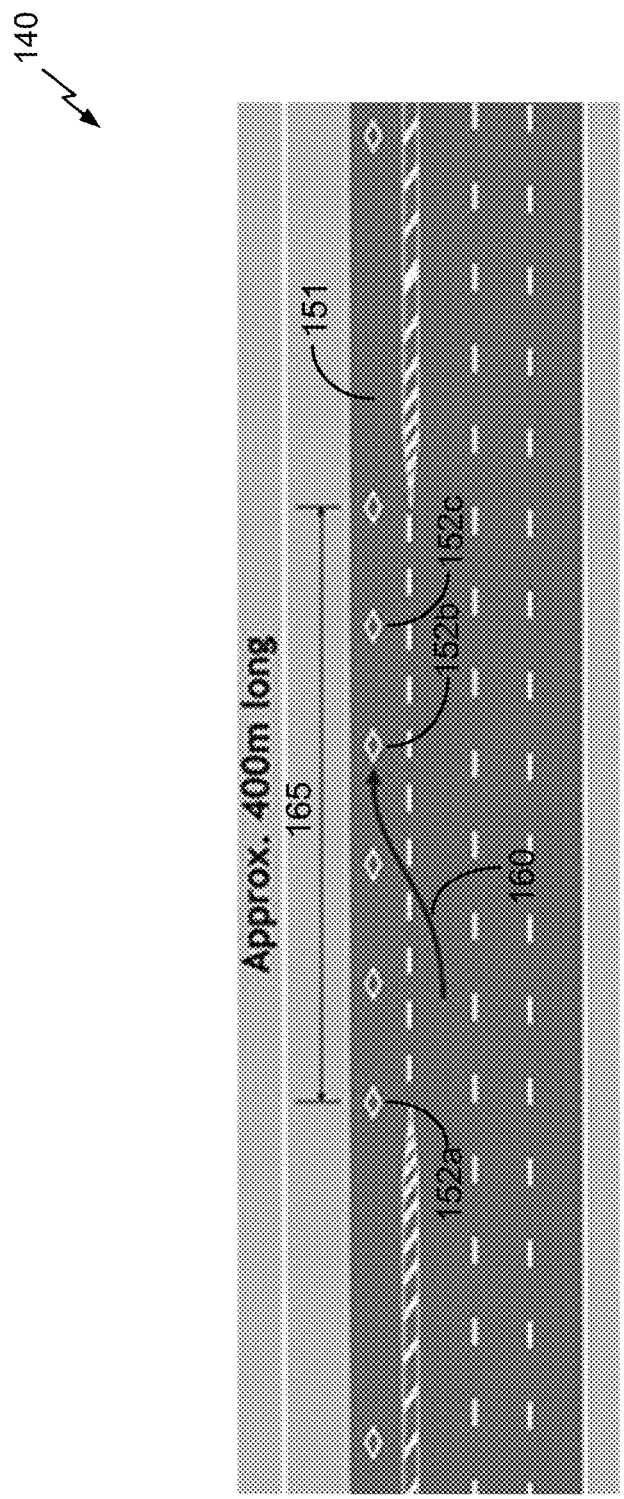
FIG. 1B is another view of a restricted access lane.

FIG. 1B is another view 140 of a restricted access lane 151. Similar to the restricted access lane 101 of FIG. 1A, the restricted access lane 151 is also a car pool lane, indicated by the diamonds 152a-c. FIG. 1B also shows a path 160 that a vehicle may take when entering the restricted access lane 151. An entrance to the restricted access lane 151 165 is shown as 400 meters long, which may or may not be a typical length for a restricted access lane entrance and/or exit. At a typical highway speed of 65 miles per hour, the 400 meter long exit will pass by in approximately fifteen (15) seconds.

FIGS. 2A-2E show examples of signs that may indicate the presence of a restricted access lane. In particular sign 201a shown in FIG. 2A may indicate that a restricted access lane exists directly below the sign, given the presence of the arrow 202. In some embodiments, the words "Carpools Only" 203 may be detected via optical character recognition to detect that the sign 201a indicates the presence of a restricted access lane. The arrow 202 may also be detected to determine that the restricted access lane exists in a lane directly below the sign.

Figure 2A:
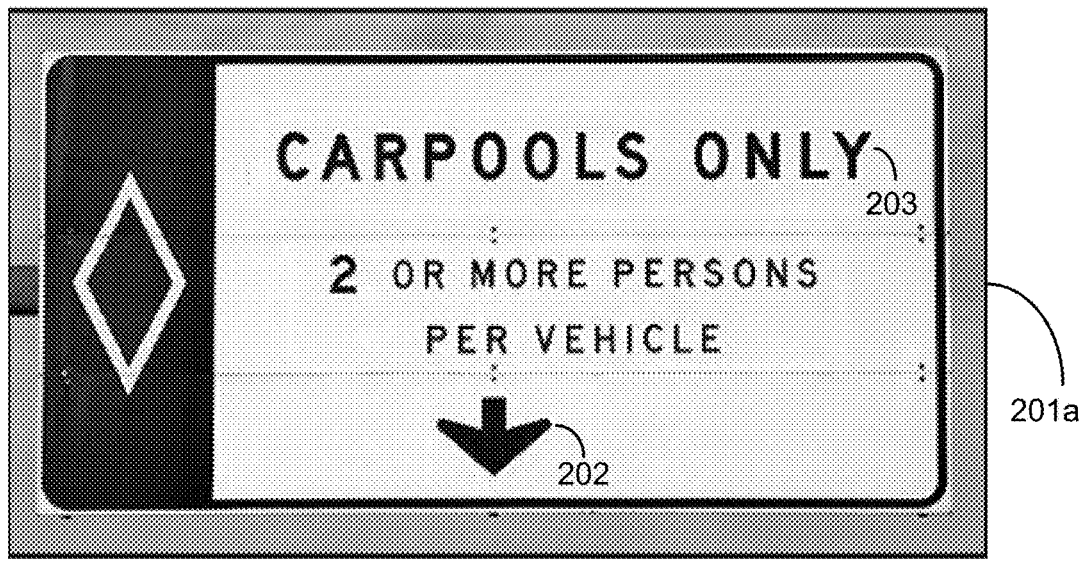
FIGS. 2A-2E show examples of signs that may indicate the presence of a restricted access lane.
Figure 2B:
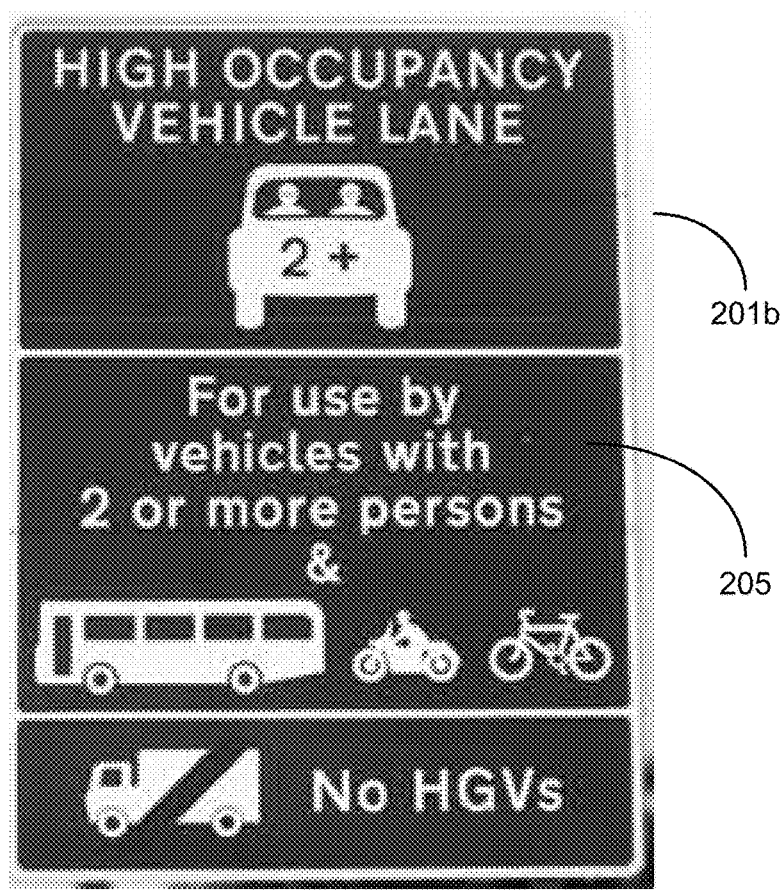

FIG. 2B shows another example of a sign 201b that may indicate the presence of a restricted access lane. In some aspects, optical character recognition may be performed on the sign to determine the minimum number of occupants that are required in order to enter the restricted access lane. For example, the text "2 or more persons" 205 may be recognized, for example, by comparing the text to a sign database, to determine a minimum number of occupants required to enter a restricted access lane indicated by the sign 201b.

Figure 2C:
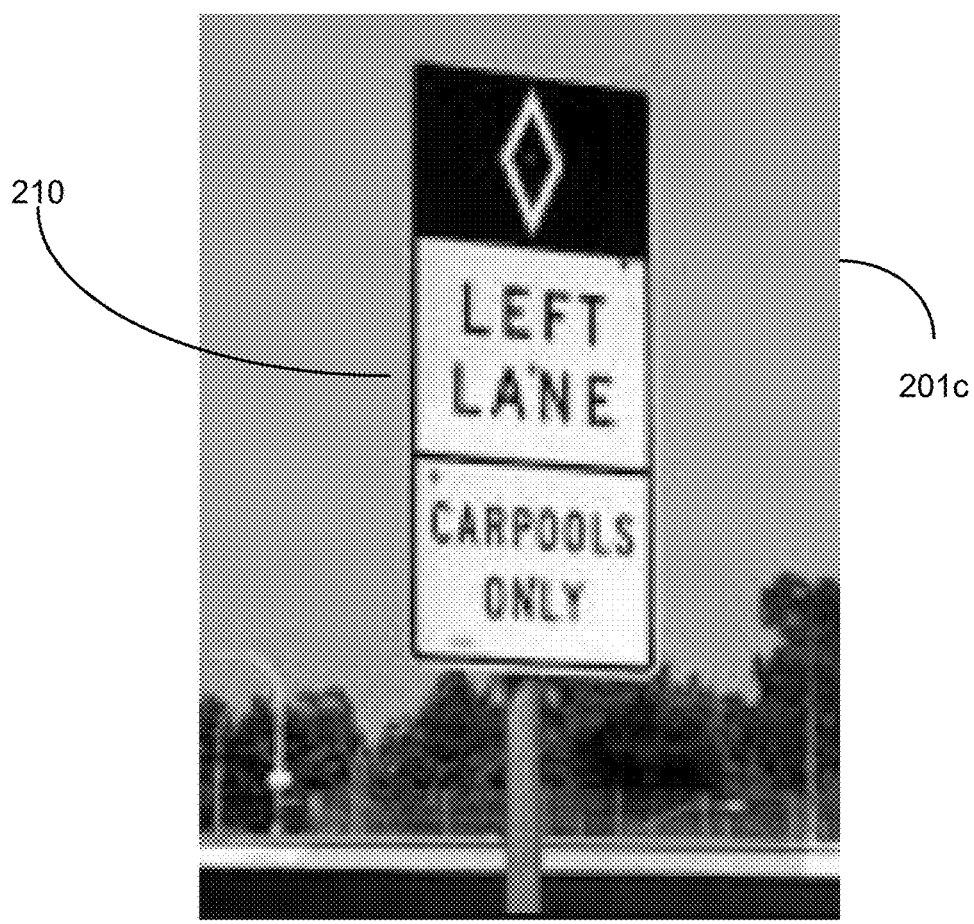

FIG. 2C shows another example sign 201c. In some aspects, optical character recognition may be performed on the sign 201c to determine a position of a restricted access lane. For example, in some aspects, the text "Left Lane" 210 may be identified as indicating a position of a restricted access lane. For example, in some aspects, detection of the text 210 may be used in conjunction with lane positions, known from either a front facing camera or a lane position database, to determine a position of a restricted access lane.

Figure 2D:
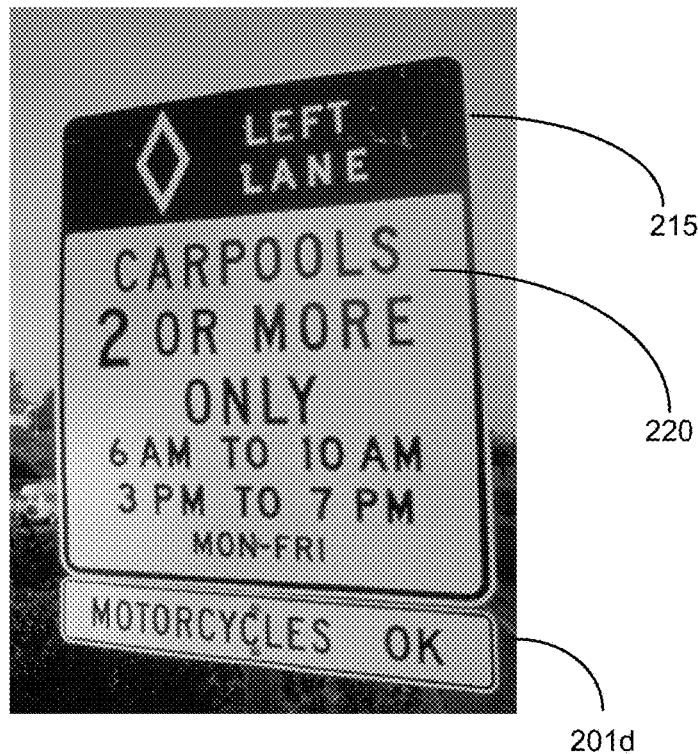

FIG. 2D shows another example sign 201d. Sign 201d may be used to determine one or more of a position of a restricted access lane and/or a minimum number of occupants required to enter the identified restricted access lane. For example, in some aspects, the text "left lane" 215 may be detected via optical character recognition, and in conjunction with lane positions known from one or more of lane recognition from a front facing camera and/or a lane position database, used to identify a position of a restricted access lane. In some aspects, the text "2 or more only" 220 may be compared to text stored in a sign database to determine a minimum number of occupants associated with the detected restricted access lane.

Figure 2E:

FIG. 2E shows another example sign 201e. In some aspects, the text "HOV LANE AHEAD" 230 may be detected via optical character recognition to detect an upcoming entrance to a restricted access lane. In some aspects, since the sign 201e provides a generalized indication of an entrance to a restricted access lane, the sign 201e may be used to provide one or more visual and/or audio alerts of the upcoming entrance.

Figure 3A:
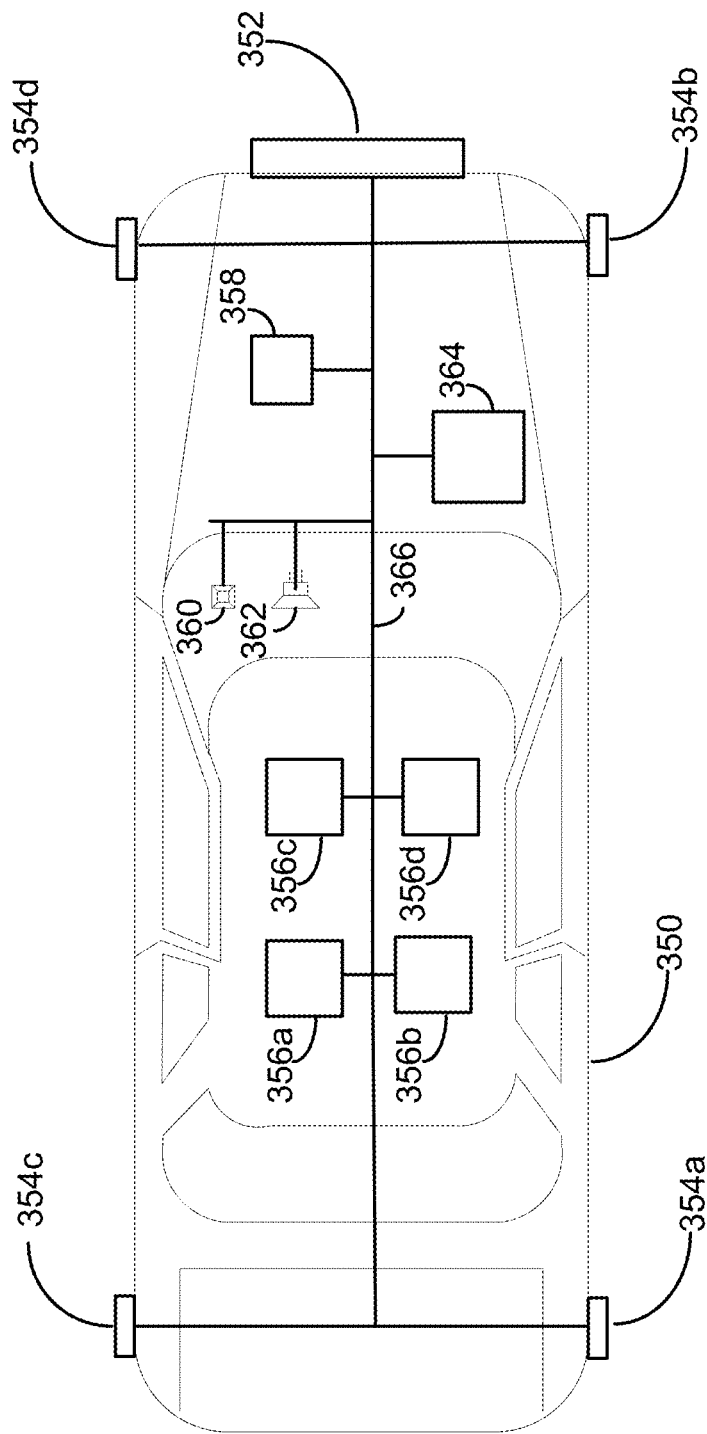
FIG. 3A illustrates a vehicle that may implement one or more of the disclosed embodiments.

FIG. 3A shows an example vehicle that may implement one or more of the disclosed embodiments. While the vehicle 350 shown in FIG. 3A may resemble a passenger vehicle, one of skill in the art would recognize that this is just an example vehicle, and the disclosed methods, apparatus, and systems may be applied to any vehicle, including the non-exclusive examples of trucks, sport utility vehicles, motorcycles, tractors, military vehicles such as tanks and self-propelled guns, and construction vehicles such as bulldozers and graders. The example vehicle 350 includes one or more front facing imaging sensors 352, side facing imaging sensors 354a-d, occupant sensors 356a-d, an electronic steering controller 358, alert light 360, speaker 362, and lane entrance assist computer 364

The one or more front facing imaging sensors 352 may be configured to capture images in front of the vehicle 350. The side facing imaging sensors 354a-d may be configured to capture images at the side of the vehicle 350. The occupant sensors 356a-d may detect the presence of an occupant in one or more seats within the vehicle. The electronic steering controller 358 may cause mechanical actuation of a steering mechanism of the vehicle (not shown) in order to execute a turn and/or lane change of the vehicle as it moves down a road. The light 360 may be configured to visually alert a driver of the vehicle 350 to an upcoming lane entrance opportunity in some embodiments. The speaker 362 may be configured to provide an audio alert to a driver of the vehicle 350 to an upcoming lane entrance opportunity in some embodiments. The lane assistance computer 364 may be configured to analyze input from one or more of the front facing imaging sensor 352, side facing imaging sensors 354a-d, occupant sensors 356a-d, and the electronic steering controller 358 in order to provide an output signal relating to one or more lane entrance parameters based one or more of the input signals. In some aspects, the output signal may be provided to one or more of the light 360, speaker 362, and/or electronic steering controller 358. The lane entrance computer 364 may communicate with one or more of the front facing sensor 352, side facing sensors 354a-d, occupant detection sensors 356a-d, electronic steering controller 358, light 360, and speaker 362 via a bus 366. In some aspects, the bus 366 is a controller area network (CAN) bus.

Figure 3B:
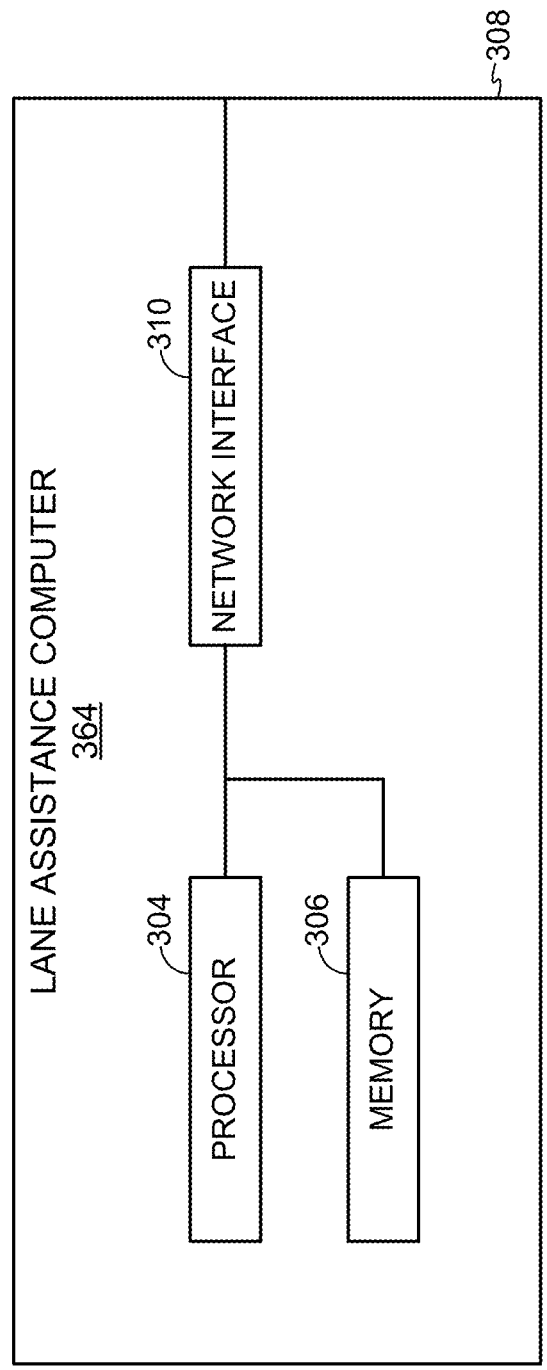
FIG. 3B illustrates an example of a device or system which may generate an output signal based on entrance parameters for a restricted access vehicle lane according to the embodiments disclosed herein.

FIG. 3B illustrates an example of a lane entrance computer 364 which may generate an output signal based on entrance parameters for a restricted access vehicle lane according to the embodiments disclosed herein. The device 364 may include an electronic hardware processor 304 which controls operation of the device 364. The processor 304 may also be referred to as a central processing unit (CPU). The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, graphics processor units (GPUs), or any other suitable entities that can perform calculations or other manipulations of information.

Memory 306, which may include both read-only memory (ROM) and random access memory (RAM), may provide instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein. The memory 306 may also comprise machine-readable media.

The memory 306 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors 304, may cause the device 364 to perform the various functions described herein. Accordingly, the processing system may include, e.g., hardware, firmware, and software, or any combination therein.

The device 364 may also include a housing 308, and a network interface 310 to allow transmission and reception of data between the device 364 and one or more other devices on a network, such as the network 366 illustrated in FIG. 3A.

The network interface 310 can be configured to transmit or receive messages over the network. The processor 304 may process messages and data to be transmitted via the network interface 210. The processor 304 may also process messages and data received via the network interface 210. The received information may include, for example, location information indicating a position of a vehicle.

The various components of the device 364 may be coupled together by a second bus system 326. The bus system 326 may include a data bus, for example, as well as a power bus, a control signal bus, and a status signal bus in addition to the data bus. Those of skill in the art will appreciate that the components of the device 364 may be coupled together or accept or provide inputs to each other using some other mechanism.

Although a number of separate components are illustrated in FIG. 3, those of skill in the art will recognize that one or more of the components may be combined or commonly implemented. For example, the processor 304 may be used to implement not only the functionality described above with respect to the processor 304, but also to implement the functionality described above with respect to the memory 306 and/or network interface 310. Further, each of the components illustrated in FIG. 3 may be implemented using a plurality of separate elements.

Figure 4:
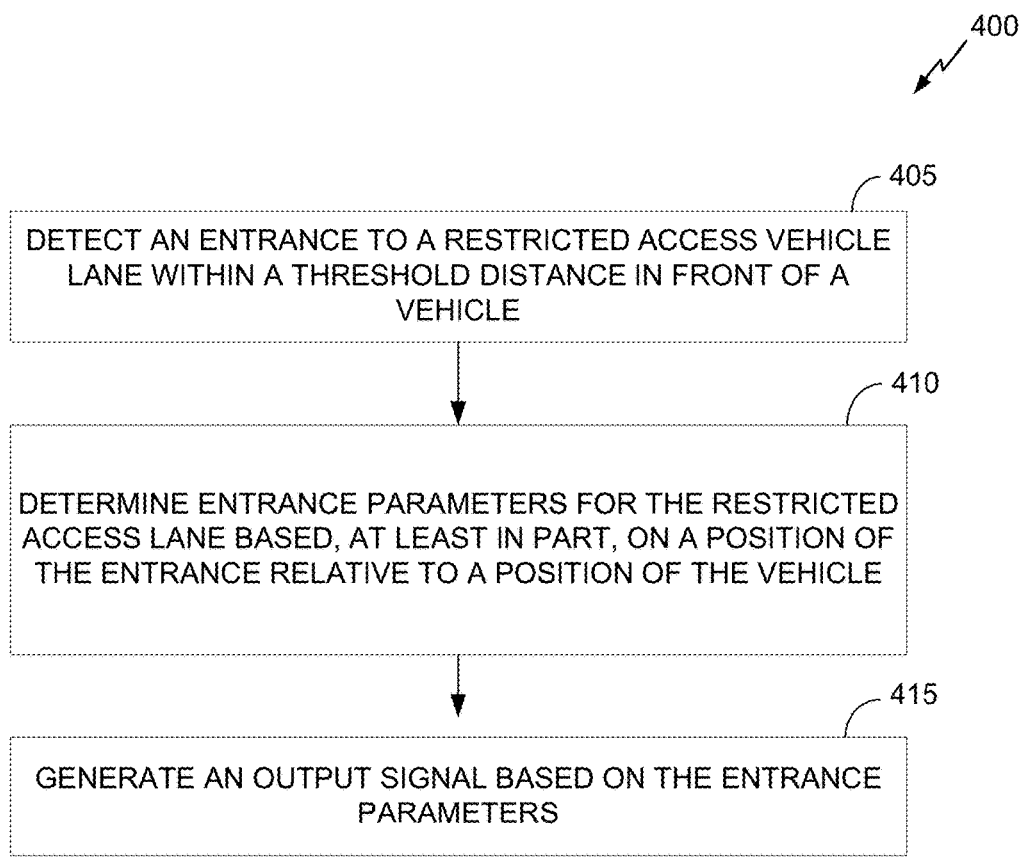
FIG. 4 is a flowchart of a method of generating an output signal based on entrance parameters for a restricted access vehicle lane.

FIG. 4 is a flowchart of a method of generating an output signal based on entrance parameters for a restricted access vehicle lane. The process 400 may be implemented, in some aspects, by the device 364 discussed above. For example, instructions in the memory 306 may configure the processor 304 in some aspects to perform the process 400.

In block 405, an entrance to a restricted access vehicle lane is detected within a threshold distance in front of a vehicle. In some aspects, the entrance may be detected based on one or more images captured by one or more front and/or side mounted imaging sensors mounted to the vehicle, such as sensor(s) 352 shown in FIG. 3A.

In some aspects, the sign detected in block 405 may be substantially similar to one or more of the signs 201a-e shown above in FIGS. 2A-2D. For example, block 405 may detect a rectangular object in one or more images captured by a front and/or side facing camera. After detection of the rectangular object, an optical character recognition process may be performed on the detected object. Any characters recognized may be compared to data stored in a sign database to determine whether the rectangular object indicates an entrance to a restricted access lane. For example, the database may associate one or more of the character strings "carpool" "high occupancy vehicle," and/or "HOV", with a possible entrance to a restricted access lane. In some aspects, the optical character recognition may also detect symbols within the rectangular object, such as the diamond symbol shown in sign 210 of FIG. 2C. Detection of the diamond symbol may be associated with detection of a car pool name in some aspects.

In some aspects, a distance to the entrance may be based on a size of the rectangular object in the one or more images. For example, in some aspects, the sign database may store a reference size and reference distance of one or more signs indicating an entrance to a restricted access lane, such as any of the signs 201*a-e* shown above in FIGS. 2A-2D. A size of a rectangular object determined to be a particular sign may then be compared to the reference size of the detected sign in the sign database. A distance to the detected sign may then be determined based on the reference size/distance of the detected sign in the sign database. For example, a difference between the reference distance and distance to the detected sign may be proportional to a difference between a size of the reference sign compared to the size of the detected sign.

In block 410, entrance parameters for a restricted access lane are determined based, at least in part, on a position of the entrance relative to a position of the vehicle. In some aspects, the entrance parameters may include one or more parameters relating to whether a vehicle should enter or exit the restricted access lane. For example, in some aspects, the entrance parameters may include one or more of a distance from the vehicle to a position of a start of the entrance to the restricted access lane, a distance from the vehicle to a position of the end of the entrance to the restricted access lane, a number of occupants in the vehicle, a number of occupants in the vehicle required to use the restricted access lane, whether the vehicle is authorized to utilize the restricted access lane, a distance to the next entrance/exit of the restricted access lane, an indication of speeds of other vehicles in a portion of the restricted access lane proximate to the vehicle, whether an on-board computer recommends entering or exiting the restricted access lane, whether a solid or dashed line separates the vehicle from the restricted access lane at a current position, and whether the entrance to the restricted access lane is clear of other vehicles or obstacles.

In some aspects, block 410 includes reading data from a map database indicating a position of the entrance to the restricted access lane, and detecting the entrance to the restricted access based, at least in part, on the data. For example, in some aspects, the map database may provide coordinates for a position of the lane entrance. Process 400 may compare those coordinates to a current position of the vehicle, for example, as provided by an on-board GPS receiver.

In some aspects, block 410 includes reading data from one or more occupant sensors in the vehicle, such as one or more of occupant sensors 356*a-d* shown in FIG. 3A above. The entrance parameters may be based on the input.

In block 415, an output signal is generated based on the entrance parameters. In some aspects, the output signal may be a signal to generate a prompt. For example, the prompt may be an audio or visual prompt alerting a driver to a recommendation that the restricted access lane may be entered. In these aspects, process 400 may then receive input from the driver, for example, via a button located on the vehicle dashboard or steering wheel, the input acknowledging the prompt, and indicating whether the recommendation to enter the restricted access lane is accepted or not. Process 400 may then command the vehicle to enter the lane consistent with the response to the prompt.

In some aspects, process 400 electronically controls the vehicle to enter the restricted access lane based on the entrance parameters and the output signal. The output signal may be one or more control signals to an electronic steering controller of the vehicle commanding the vehicle to enter the restricted occupancy lane. In some aspects, process 400 generates an audio or visual alert based on the entrance parameters and the output signal.

Figure 5:
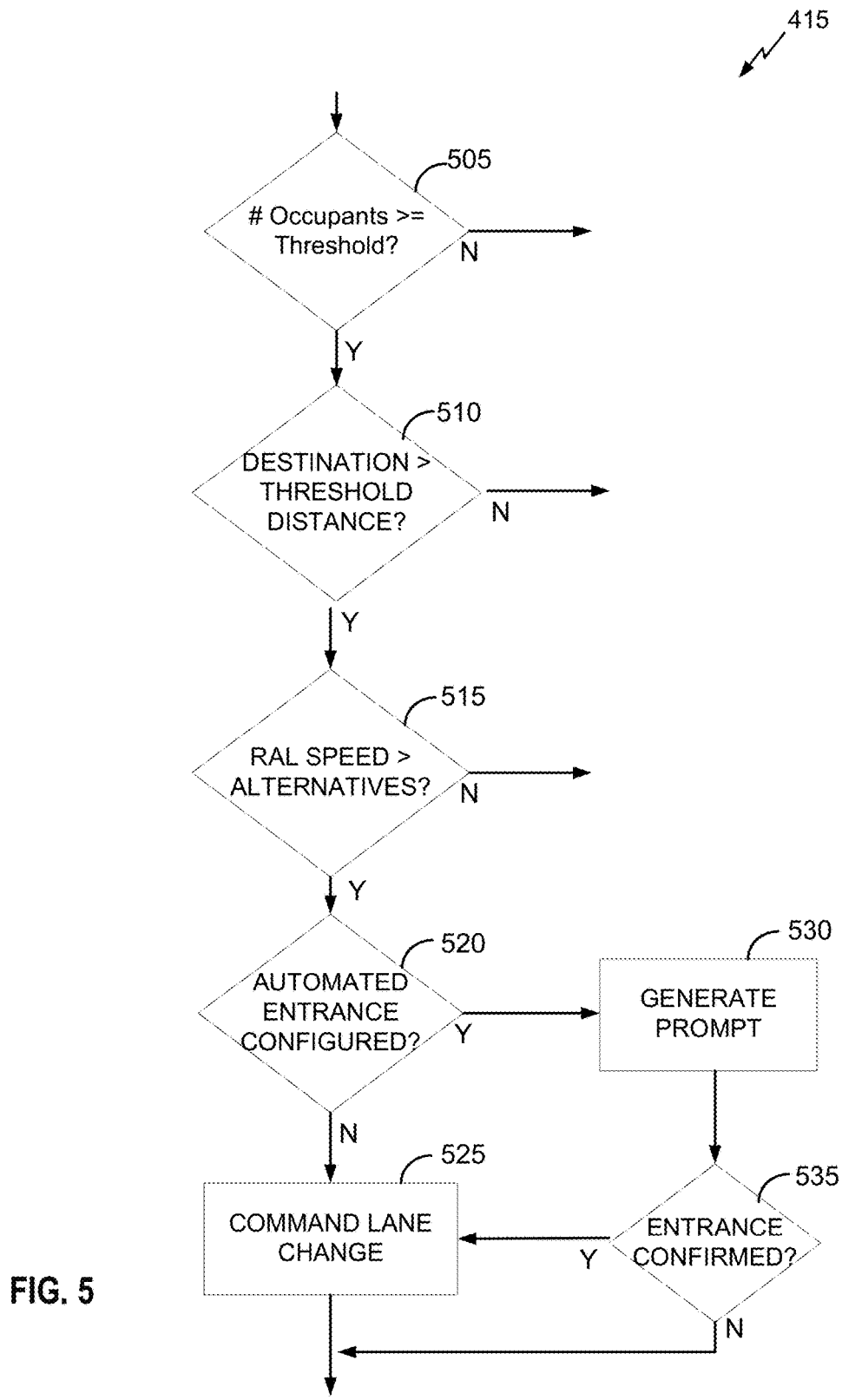
FIG. 5 is a flowchart of one method of generating an output signal based on entrance parameters.

FIG. 5 is a flowchart of one method of generating an output signal based on entrance parameters. In some aspects, process 415 of FIG. 5 may be performed as part of block 415 of FIG. 4. While FIG. 5 shows several blocks, including decision blocks 505, 510, 515, and 520, one of skill in the art should understand that some implementations may omit one or more of the evaluations represented by the decision blocks of FIG. 5. In some aspects, process 415 may be implemented by instructions for processor 304 stored in the memory 306 of device 364.

In decision block 505, a number of detected occupants is compared to an occupant threshold for the detected restricted access lane. For example, in some aspects, input may be read from one or more occupant sensors of a vehicle to determine a number of occupants in the vehicle. Furthermore, some aspects may utilize a road database to determine a number of occupants required to enter a restricted access lane. The number of detected occupants may then be compared to the number of required occupants to determine whether the vehicle may enter the restricted access lane. If the number of occupants is below the required number of occupants, or a threshold value as shown, then no output signal may be generated by process 415. However, if the number of occupants is greater than or equal to the threshold, processing continues at decision block 510, which determines whether a distance to a vehicle destination is greater than a threshold distance. For example, in some aspects, the device 364 of FIG. 3 may interface with a vehicle navigation computer to determine a distance to a destination of the vehicle. If the vehicle is relatively close to the destination, for example, below or equal to the threshold distance, it may not be advantageous to enter the restricted access lane. In some aspects, no output signal may be generated by process 415.

If the destination is greater than the threshold distance, then processing continues at decision block 515, which determines whether a speed in the restricted access lane is greater than other alternative lanes. For example, in some aspects, an on-board computer performing process 415 may read one or more off-board traffic information databases, for example, via a wireless connection to the Internet, to determine an average or median speed of the restricted access line within a vicinity of the vehicles present position. The on-board computer may also read the road database to determine average or median speeds of vehicles in other lanes ahead of the vehicle and/or that are available to reach a destination of the vehicle. My comparing the average speeds in the available lanes, the on-board computer may select the fastest or a relatively faster lane to travel in. If the restricted access lane is the fastest lane, then process 415 moves to decision block 520.

Decision block 520 evaluates whether a fully automated entrance is configured. In other words, decision block 520 determines whether it should prompt the driver that a change of lanes into the restricted access lane is possible and/or recommended, or whether the lane change should be performed without human confirmation. If automated entrance to the restricted access lane is not configured, then process 415 transitions to block 530, where a prompt is generated. The prompt generated in block 530 may be one or more of an audio, visual, or tactile prompt to gain a driver or other vehicle controller's attention that a lane change into the restricted access lane is possible and/or recommended by the on-board computer. After the prompt is generated by block 530, process 415 moves to decision block 535, which determines whether an entrance into the restricted access lane is confirmed. In some aspects, entrance may be confirmed by either reception of input from an operator/driver of the vehicle, or by the absence of input from an operator/driver of the vehicle. For example, in some aspects, the vehicle may be configured such that an absence of input within a predetermined time period after the prompt generated in block 530 confirms that the entrance into the restricted access lane should be performed. In other aspects, the vehicle may be configured such that an absence of input within a predetermined time period acts as a rejection of a recommendation to transition into the restricted access lane. If the entrance into the restricted access lane is confirmed by decision block 535, then a lane change is commanded by the on board computer. Commanding a lane change may include, in some aspects, sending one or more commands to an electronic steering controller that cause the vehicle to alter its course such that the vehicle moves into the restricted access lane. Returning to the discussion of decision block 520, if the automated entrance is configured such that no human input is required, process 415 may transition directly from decision block 520 to block 525, where a lane change is commanded.

In some aspects, process 500 may consider whether the vehicle has a special status when determining whether to command the lane change as described with respect to block 525. For example, in some aspects, electric vehicles or lower pollution vehicles may be able to enter a car pool lane regardless of the number of occupants. Thus, process 500 may compare the vehicle's status to determine if its status qualifies it to enter a car pool lane regardless of the number of occupants. If the vehicles status qualifies, process 500 may move to block 525. This function may be performed before decision block 505 in some aspects.

The foregoing description details certain implementations of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the development should not be taken to imply that the terminology is being re-defined herein to be restricted to including any specific characteristics of the features or aspects of the technology with which that terminology is associated.

The technology is operational with numerous other general purpose or special purpose computing system environments or configurations. Examples of well-known computing systems, environments, and/or configurations that may be suitable for use with the development include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX® or Microsoft Windows®.

The system control may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system control may also be written using interpreted languages such as Perl, Python or Ruby.

Those of skill will further recognize that the various illustrative logical blocks, modules, circuits, and algorithm steps described in connection with the implementations disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present development.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

The foregoing description details certain implementations of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the development should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the implementations. It will also be appreciated by those of skill in the art that parts included in one implementation are interchangeable with other implementations; one or more parts from a depicted implementation can be included with other depicted implementations in any combination. For example, any of the various components described herein and/or depicted in the Figures may be combined, interchanged or excluded from other implementations.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present development. At the very least, and not as an attempt to limit the application of the doctrine of equivalents to the scope of the claims, each numerical parameter should be construed in light of the number of significant digits and ordinary rounding approaches.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled"

to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present disclosed process and system. Various modifications to these implementations will be readily apparent to those skilled in the art, and the generic principles defined herein may be applied to other implementations without departing from the spirit or scope of the disclosed process and system. Thus, the present disclosed process and system is not intended to be limited to the implementations shown herein but is to be accorded the widest scope consistent with the principles and novel features disclosed herein.

What is claimed is:

1. A method of assisting movement of a vehicle from one lane to another via a lane assistance computer, the method comprising:
    detecting, based at least in part on one or more images captured from an imaging sensor of the vehicle:
        a restricted access lane in which access is restricted to vehicles that satisfy predetermined entrance parameters, wherein the restricted access lane comprises a carpool lane, and
        an entrance to the restricted access lane a distance in front of the vehicle;
    determining the predetermined entrance parameters that must be satisfied for access to the restricted access lane, wherein the predetermined entrance parameters comprise a minimum number of occupants;
    reading input from one or more occupant sensors to determine a number of occupants in the vehicle;
    determining whether the vehicle satisfies the predetermined entrance parameters based at least in part on comparing the number of occupants to the minimum number of occupants; and
    at least partly in response to determining that the vehicle satisfies the predetermined entrance parameters, generating an output signal for electronically controlling the vehicle to enter the restricted access lane via the entrance.

2. The method of claim 1, further comprising generating the output signal based on at least one additional factor that indicates whether the vehicle should enter the restricted access lane.

3. The method of claim 2, further comprising generating an audio or visual alert based on the predetermined entrance parameters, at least one additional factor, and the output signal.

4. The method of claim 1, further comprising reading data from a map database indicating a position of the entrance to the restricted access lane, and detecting the entrance to the restricted access lane based at least in part on the data from the map database.

5. The method of claim 1, further comprising:
    capturing a plurality of images of a scene in front of the vehicle;
    determining whether a line on a left side of the vehicle is a dashed line or a solid line based on the plurality of images; and
    detecting the entrance based on whether the line is dashed or solid.

6. The method of claim 2, further comprising:
    capturing an image of a scene in front of the vehicle using the imaging sensor;
    detecting a car pool sign within the image;
    detecting a position of the entrance based on the car pool sign, wherein the at least one additional factor includes the position of the entrance relative to a position of the vehicle; and
    determining whether to enter the restricted access lane based at least partly on the position of the entrance relative to the position of the vehicle.

7. The method of claim 1, further comprising:
    capturing an image of a scene in front of the vehicle using the imaging sensor;
    detecting a car pool sign within the image;
    determining a time restriction of the restricted access lane based on the car pool sign; and
    determining one of the predetermined entrance parameters based on the time restriction.

8. The method of claim 2, further comprising:
    determining a position of an exit from the restricted access lane, wherein the at least one additional factor includes the position of the exit; and
    determining whether to enter the restricted access lane based at least in part on the determined position of the exit.

9. The method of claim 8, further comprising:
    determining a destination for the vehicle from a navigation computer, wherein the at least one additional factor also include the destination; and
    determining whether to enter the restricted access lane based at least in part on the position of the exit and the determined destination.

10. A vehicle that provides electronic assistance for lane changes, comprising:
an imaging sensor;
a lane assistance computer, operably coupled to the imaging sensor, and configured to:
detect an entrance to a restricted access lane within a threshold distance in front of the vehicle based on images captured by the imaging sensor, wherein the restricted access lane comprises a carpool lane, wherein access to the restricted access lane is restricted to vehicles that satisfy entrance parameters,
determine the entrance parameters for the restricted access lane, wherein the predetermined entrance parameters comprise a minimum number of occupants,
read input from the occupant sensor to determine a number of occupants in the vehicle,
determine whether the vehicle satisfies the entrance parameters based at least partly on comparing the number of occupants to the minimum number of occupants, and
at least partly in response to determining that the vehicle satisfies the entrance parameters, generate an output signal for electronically controlling the vehicle to enter the restricted access lane via the entrance.

11. The vehicle of claim 10, further comprising a speaker, wherein the lane assistance computer is configured to generate the output signal as an audio alert using the speaker, wherein the alert is generated based on the entrance parameters.

12. The vehicle of claim 10, further comprising a light, wherein the lane assistance computer is configured to generate the output signal as a visual alert using the light, wherein the visual alert is generated based on the entrance parameters.

13. The vehicle of claim 10, further comprising:
a steering gear; and
an electronic steering controller, wherein the lane assistance computer is configured to change a lane of the vehicle by generating the output signal to cause mechanical actuation of the steering gear via the electronic steering controller.

14. The vehicle of claim 10, wherein the lane assistance computer is further configured to read data from a map database indicating a position of the entrance to the restricted access lane, and detecting the entrance to the restricted access based, at least in part, on the data.

15. The vehicle of claim 10, wherein the lane assistance computer is further configured to:
capture a plurality of images of a scene in front of the vehicle using the imaging sensor;
determine whether a line on a left side of the vehicle is a dashed line or a solid line based on the plurality of images; and
determine the entrance parameters based on whether the line is dashed or solid.

16. The vehicle of claim 10, wherein the lane assistance computer is further configured to:
capture an image of a scene in front of the vehicle via the imaging sensor,
detect a car pool sign within the image,
detect a position of the entrance based at least in part on the car pool sign, and
determine the entrance parameters based on the position of the entrance.

17. The vehicle of claim 10, wherein the lane assistance computer is further configured to:
capture an image of a scene in front of the vehicle via the imaging sensor,
detect a car pool sign within the image,
determine a time restriction of the restricted access lane based on the car pool sign, and
determine the entrance parameters based on the time restriction.

18. The vehicle of claim 10, wherein the lane assistance computer is further configured to:
determine a position of an exit from the restricted access lane, and
determine whether to enter the restricted access lane based at least in part on the determined position of the exit.

19. The vehicle of claim 18, wherein the lane assistance computer is further configured to:
determine a destination for the vehicle from a navigation computer, and
determine whether to enter the restricted access lane based at least in part on the position of the exit and the determined destination.

20. An apparatus for assisting movement of a vehicle from one lane to another, comprising:
an electronic hardware processor;
an electronic hardware memory, operably coupled to the processor, and storing instructions that configure the electronic hardware processor to:
detect an entrance to a restricted access lane within a threshold distance in front of the vehicle, wherein access to the restricted access lane is restricted to vehicles that satisfy entrance parameters, wherein the restricted access lane comprises a carpool lane,
determine the entrance parameters for the restricted access lane, wherein the predetermined entrance parameters comprise a minimum number of occupants,
read input from one or more occupant sensors to determine a number of occupants in the vehicle,
determine whether the vehicle satisfies the entrance parameters based at least in part on comparing the number of occupants to the minimum number of occupants, and
at least partly in response to determining that the vehicle satisfies the entrance parameters, generate an output signal for electronically controlling the vehicle to enter the restricted access lane via the entrance.

21. The apparatus of claim 20, wherein the electronic memory stores further instructions that configure the electronic hardware processor to generate an audio or visual alert based on the entrance parameters.

22. The apparatus of claim 20, wherein the electronic memory stores further instructions that configure the electronic hardware processor to:
read data from a map database indicating a position of an entrance to the restricted access lane, and
detect the entrance to the restricted access lane based, at least in part, on the data.

23. The apparatus of claim 20, wherein the electronic memory stores further instructions that configure the electronic hardware processor to
capture a plurality of images of a scene in front of the vehicle, determine whether a line on a left side of the vehicle is a dashed line or a solid line based on the plurality of images, and determine the entrance parameters based on whether the line is dashed or solid.

24. The apparatus of claim 20, wherein the electronic memory stores further instructions that configure the electronic hardware processor to capture an image of a scene in front of the vehicle, detect a car pool sign within the image, and detect a position of the entrance based on the car pool sign.

25. The apparatus of claim 20, wherein the electronic memory stores further instructions that configure the electronic hardware processor to capture an image of a scene around the vehicle, detect a car pool sign within the image, determine a time restriction of the restricted access lane based on the car pool sign;

determine at least one of the entrance parameters based on the time restriction.

26. The apparatus of claim 20, wherein the electronic memory stores further instructions that configure the electronic hardware processor to determine a position of an exit from the restricted access lane, wherein one of the entrance parameters comprises the position of the exit, and determine whether to enter the restricted access lane based at least in part on the determined position of the exit.

27. The apparatus of claim 26, wherein the electronic memory stores further instructions that configure the electronic hardware processor to:

determine a destination for the vehicle from a navigation computer; and determine whether to enter the restricted access lane based at least in part on the position of the exit and the determined destination.

28. A non-transitory computer readable storage medium comprising instructions that when executed cause a processor to perform a method of assisting movement of a vehicle from one lane to another, the method comprising:

detecting an entrance to a restricted access lane within a threshold distance in front of the vehicle, wherein access to the restricted access lane is restricted to vehicles that satisfy entrance parameters, wherein the restricted access lane comprises a carpool lane;

reading input from one or more occupant sensors to determine a number of occupants in the vehicle;

determining the entrance parameters for the restricted access lane, wherein the predetermined entrance parameters comprise a minimum number of occupants;

determining whether the vehicle satisfies the entrance parameters based at least in part on comparing the number of occupants to the minimum number of occupants; and at least partly in response to determining that the vehicle satisfies the entrance parameters, generating an output signal for electronically controlling the vehicle to enter the restricted access lane via the entrance.

29. The computer readable storage medium of claim 28, the method further comprising generating an audio or visual alert based on the entrance parameters.

30. The computer readable storage medium of claim 28, the method further comprising reading data from a map database indicating a position of an entrance to restricted access lane, and detecting the entrance to the restricted access lane based, at least in part, on the data.

31. The computer readable storage medium of claim 28, the method further comprising:

capturing a plurality of images of a scene in front of the vehicle;

determining whether a line on a left side of the vehicle is a dashed line or a solid line based on the plurality of images; and determining the entrance parameters based on whether the line is dashed or solid.

32. The computer readable storage medium of claim 28, the method further comprising:

capturing an image of a scene in front of the vehicle;

detecting a car pool sign within the image;

determining the entrance parameters based on the car pool sign.

33. The computer readable storage medium of claim 32, the method further comprising determining a time restriction of the restricted access lane based on the car pool sign;

determining the entrance parameters based on the time restriction.

34. The computer readable storage medium of claim 28, the method further comprising determining a position of an exit from the restricted access lane; and determining whether to enter the restricted access lane based at least in part on the determined position of the exit.

35. The computer readable storage medium of claim 34, the method further comprising determining a destination for the vehicle from a navigation computer; and determining whether to enter the restricted access lane based at least in part on the position of the exit relative to the determined destination.

* * * * *